(12) United States Patent
Takeda et al.

(10) Patent No.: US 8,514,359 B2
(45) Date of Patent: Aug. 20, 2013

(54) LIQUID CRYSTAL DISPLAY DEVICE AND MANUFACTURING METHOD THEREFOR

(75) Inventors: Shintaro Takeda, Chiba (JP); Kotaro Araya, Hitachiota (JP); Yasushi Tomioka, Hitachinaka (JP); Masaki Matsumori, Naka-gun (JP); Yoshiro Mikami, Hitachiota (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 181 days.

(21) Appl. No.: 13/213,114

(22) Filed: Aug. 19, 2011

(65) Prior Publication Data
US 2012/0075563 A1    Mar. 29, 2012

(30) Foreign Application Priority Data
Sep. 29, 2010  (JP) ................. 2010-218225

(51) Int. Cl.
*G02F 1/1343*    (2006.01)
*G02F 1/1337*    (2006.01)

(52) U.S. Cl.
USPC ........................... 349/139; 349/123; 349/141

(58) Field of Classification Search
USPC ......................................... 349/139, 123, 141
See application file for complete search history.

(56) References Cited

U.S. PATENT DOCUMENTS 8,184,253 B2 *   5/2012   Kubota et al. ............... 349/141
2011/0001917 A1 *  1/2011   Araya et al. ............... 349/183

FOREIGN PATENT DOCUMENTS

| JP | 2001-209036 |   | 8/2001 |
| JP | 2001209036 A | * | 8/2001 |
| JP | 2011-013639 |   | 1/2011 |

* cited by examiner

*Primary Examiner* — Mike Qi
(74) *Attorney, Agent, or Firm* — Antonelli, Terry, Stout & Kraus, LLP.

(57) ABSTRACT

Provided is a liquid crystal display device, including: a liquid crystal layer filled between a first and a second substrate; two polymer structures; and a plurality of pixels each including a first and a second electrode, one of the first and the second electrode being a pixel electrode, in which: each of the plurality of pixels is provided within a region surrounded by a signal line, a part of the signal line being formed between adjacent two of the plurality of pixels; each of the two polymer structures, which extends along the part of the signal line so as to sandwich the part of the signal line in plan view and is formed from one of the first and the second substrate toward another thereof, is formed so as to overlap with any of the region; and the two adjacent polymer structures has the liquid crystal layer provided therebetween.

17 Claims, 11 Drawing Sheets

LIQUID CRYSTAL DISPLAY DEVICE AND MANUFACTURING METHOD THEREFOR

CROSS-REFERENCE TO RELATED APPLICATION

The present application claims priority from Japanese patent application JP 2010-218225 filed on Sep. 29, 2010, the content of which is hereby incorporated by reference into this application.

BACKGROUND OF THE INVENTION

1. Field of the Invention

The present invention relates to a liquid crystal display device and a manufacturing method therefor.

2. Description of the Related Art

Liquid crystal display devices are display devices, which include a liquid crystal display panel in which a liquid crystal layer is provided between a pair of substrates. The liquid crystal display devices are widely used as, for example, a liquid crystal display device for a liquid crystal television set or a personal computer, a liquid crystal display device for a cell-phone unit, and the like.

Liquid crystal display devices of this type are display devices, in which a display region of the liquid crystal display panel is constituted by an assembly of a plurality of pixels, and which display images or videos of, for example, letters, numbers, figures, and pictures by the plurality of pixels (dots). Such a display method is generally called a dot matrix method.

The dot matrix method is classified into two types depending on a drive method of the pixels, that is, a simple matrix type (also called as a passive matrix type) and an active matrix type. The simple matrix type refers to a type in which a voltage is selectively applied to electrodes for pixel formation formed on each substrate to drive a predetermined pixel. Meanwhile, the active matrix type refers to a type in which active elements (also called as switching elements) for pixel selection are formed on one substrate, and the active elements are turned ON/OFF to drive a predetermined pixel. The latter active matrix type particularly exhibits excellent performance, for example, in contrast performance and fast display performance, and hence the active matrix type has become the mainstream of the drive method of the pixels in the liquid crystal display device.

Further, examples of operation mode of a liquid crystal layer in a liquid crystal display device of this kind include a twisted nematic (TN) mode, a super twisted nematic (STN) mode, a vertical alignment (VA) mode, an optically compensated birefringence (OCB) mode, an in-plane switching (IPS) mode, and a fringe field switching (FFS) mode.

In particular, in a large-sized liquid crystal display device such as a liquid crystal television set, high contrast and high viewing angle properties are required, and for the achievement thereof, development of the IPS mode and the FFS mode has been progressed. Those needs are also required in a small-sized liquid crystal display device such as a cell phone, and hence development of IPS mode or FFS mode products has been accelerated.

Further, many of the recent cell-phone units or car navigation systems load a function of, for example, allowing a user to view a television program or playing a video. Also in the small-sized liquid crystal display device used in those portable electronic devices, in order to realize long period use, power saving has been required as a new need.

Note that, in Japanese Patent Application Laid-open No. 2001-209036, there is described a liquid crystal display device including: a first substrate including a plurality of pixel switching elements and a plurality of pixel electrodes; and a second substrate on which a counter electrode is formed, in which between the first substrate and the second substrate, a polymer network is formed at a border portion of adjacent pixels.

SUMMARY OF THE INVENTION

By the way, in order to realize power saving in the IPS mode or FFS mode liquid crystal display device, improvement in transmittance of the pixel is required. In order to improve the transmittance of the pixel, for example, it is effective to increase the size of the pixel electrode itself. However, when the size of the pixel electrode is increased, the orientation of liquid crystal in one pixel of the adjacent pixels influences the orientation of liquid crystal in another pixel thereof, and hence there has been a limit in increasing the size of the pixel electrode.

Further, as another method for improving the transmittance of the pixel, suppression of disclination is effective. However, in reality, there is no method to sufficiently avoid the disclination.

It is an object of the present invention to provide a liquid crystal display device having high transmittance, and a manufacturing method therefor. The novel features of the present invention are made apparent from the description of this specification and the attached drawings.

According to the present invention, there is provided a liquid crystal display device including: a first substrate; a second substrate; a liquid crystal layer filled between the first substrate and the second substrate; a polymer structure formed in the liquid crystal layer; and a plurality of pixels each including a first electrode and a second electrode, one of the first electrode and the second electrode being a pixel electrode, in which: each of the plurality of pixels is provided within a region surrounded by a signal line, a part of the signal line being formed between adjacent two of the plurality of pixels; the polymer structure includes two polymer structures; the two polymer structures has the liquid crystal layer provided therebetween; in plan view, the two polymer structures sandwich the part of the signal line; in plan view, each of the two polymer structures extends along the part of the signal line; the each of the two polymer structures is formed from one of the first substrate and the second substrate toward another of the first substrate and the second substrate; and the each of the two polymer structures is formed so as to overlap with any of the region.

Further, in the liquid crystal display device according to the present invention, the first electrode and the second electrode may be formed on one of the first substrate and the second substrate. Further, a color filter may be formed on one of the first substrate and the second substrate. Further, a black matrix may be formed on one of the first substrate and the second substrate. Further, the polymer structure may be formed in a region overlapping with the black matrix in plan view. Further, the polymer structure may be formed in a region other than a region in which one or both of a scanning signal line and a video signal line are overlapped with the black matrix in plan view. Further, a condition of the following Expression (1) may be satisfied, $$WP \leq (WB-WS) \text{ or } WP \leq (WB-WG) \qquad \text{Expression (1)}$$

where, in a cross section taken along a short side of the polymer structure, WP represents a width of the polymer structure, WB represents a width of the black matrix, WS represents a width of the video signal line, and WG represents a width of the scanning signal line.

Further, the polymer structure may also be formed in a region including an end portion of the pixel electrode in plan view. Further, the liquid crystal layer may contain a polymer having a density lower than a density of the polymer structure. Further, the region may have a rectangular shape in plan view, and the polymer structure may be formed so as to overlap with four sides of the region representing a border thereof. Further, the region may have a rectangular shape in plan view, and the polymer structure may be formed so as to overlap with two opposing sides out of four sides of the region representing a border thereof. Further, the polymer structure may be formed by polymerizing a polymerizable monomer in the liquid crystal layer. Further, the polymer structure may be formed by polymerizing the polymerizable monomer in presence of a photo-initiator in the liquid crystal layer.

Further, according to the present invention, there is provided a manufacturing method for a liquid crystal display device, the liquid crystal display device including: a liquid crystal layer filled between a first substrate and a second substrate; a plurality of pixels each including a first electrode and a second electrode, one of the first electrode and the second electrode being a pixel electrode; and a signal line formed between adjacent two of the plurality of pixels, in which the first electrode and the second electrode are formed on one of opposing surfaces of the first substrate and the second substrate, the manufacturing method including: filling a liquid crystal composition containing host liquid crystal and a polymerizable monomer, the liquid crystal composition being used as the liquid crystal layer, between the first substrate and the second substrate; and forming a polymer structure by polymerizing the polymerizable monomer, the polymer structure being formed in the liquid crystal layer between the signal line and the pixel electrode.

Further, the forming a polymer structure may include applying light from one surface side of one of the first substrate and the second substrate on which the signal line is formed, the one surface side not being contact with the liquid crystal layer, to thereby polymerize the polymerizable monomer. Further, the liquid crystal composition may contain an initiator. Further, the initiator may be a photo-initiator.

According to present invention, it is possible to provide a liquid crystal display device having high transmittance, and a manufacturing method therefor. Other effects of the present invention are made apparent from the description of the entire specification.

DETAILED DESCRIPTION OF THE INVENTION

Hereinafter, the present invention is described in detail by means of an embodiment with reference to the drawings. Note that, throughout all the drawings attached for describing the embodiment, components having the same functions are denoted by the same reference symbols, and repeating description thereof is omitted.

FIGS. 1 to 12 are schematic views illustrating a schematic configuration of a main part of a liquid crystal display device according to the present invention.

Figure 1:
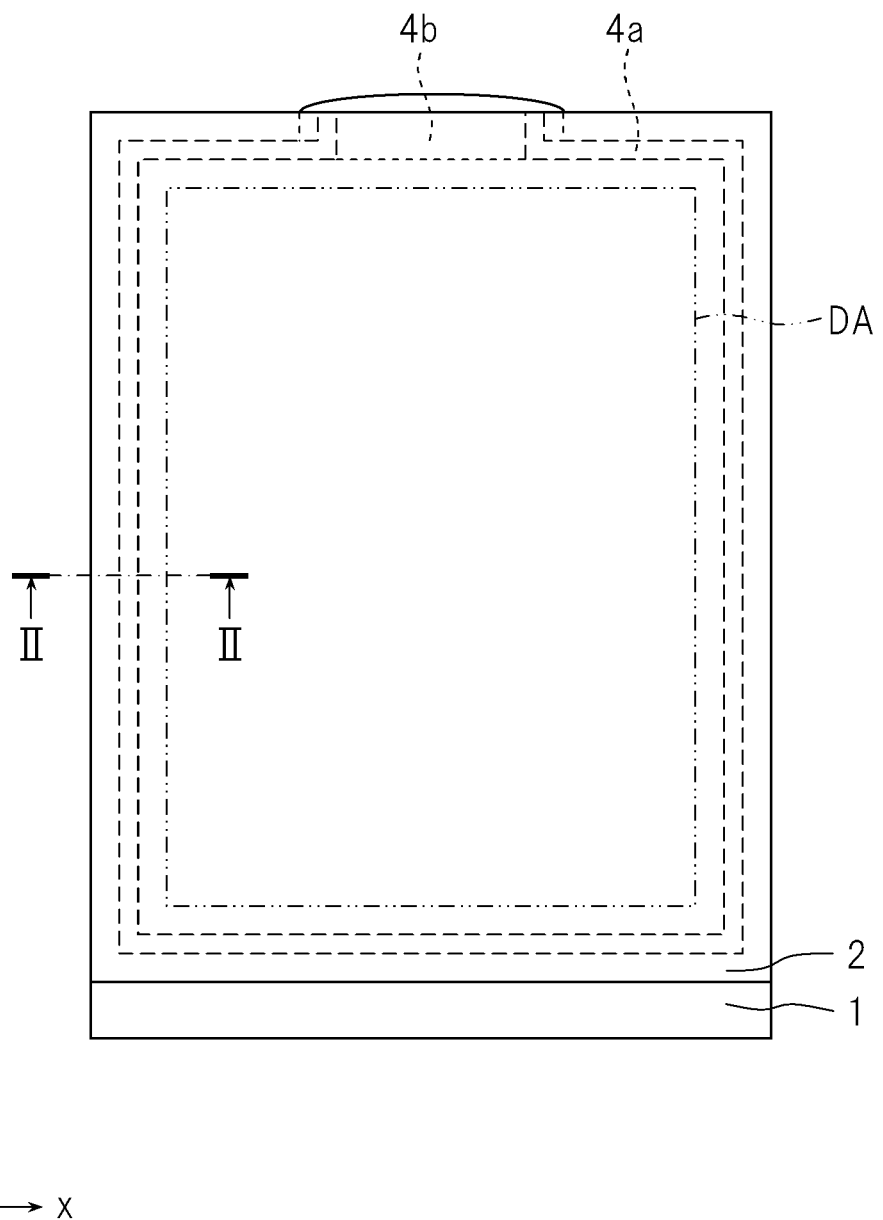
FIG. 1 is an explanatory view illustrating, in plan view, an example of a main configuration of a liquid crystal display panel according to the present invention.
Figure 2:
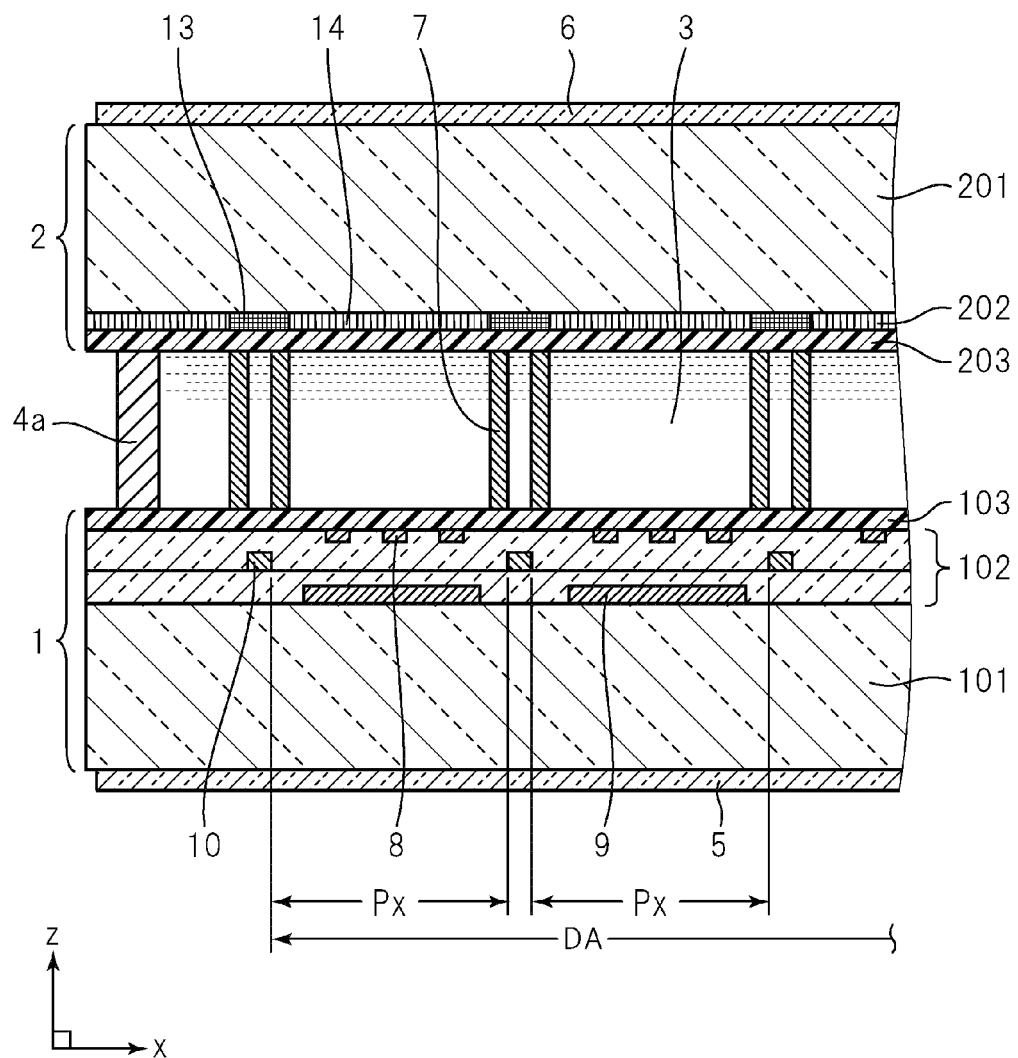
FIG. 2 is an explanatory view illustrating an example of a cross section of the liquid crystal display panel at a position taken along the line II-II of FIG. 1.
Figure 3:
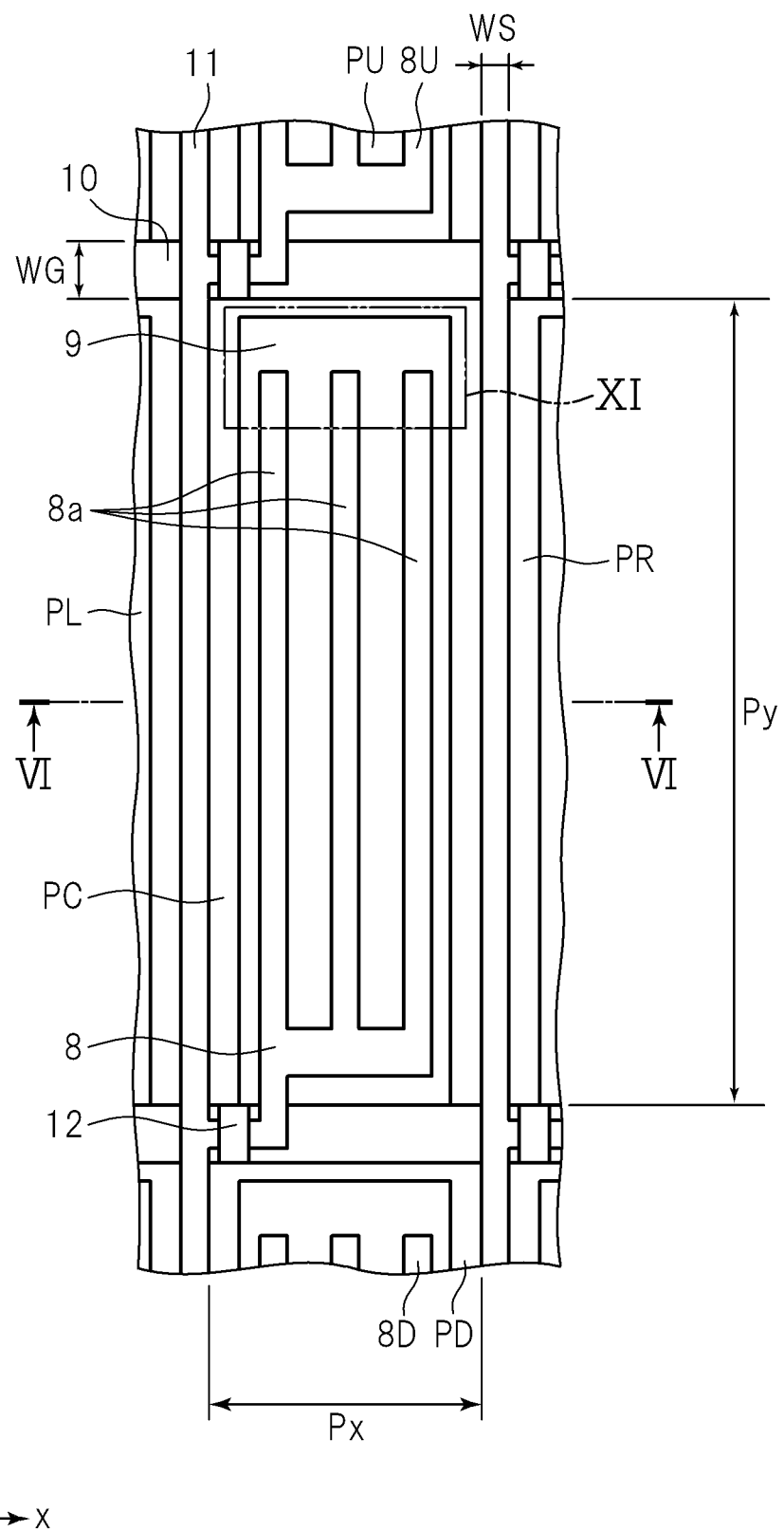
FIG. 3 is an explanatory view schematically illustrating, in plan view, an arrangement example of a main configuration of a thin film transistor (TFT) substrate according to the present invention.
Figure 4:
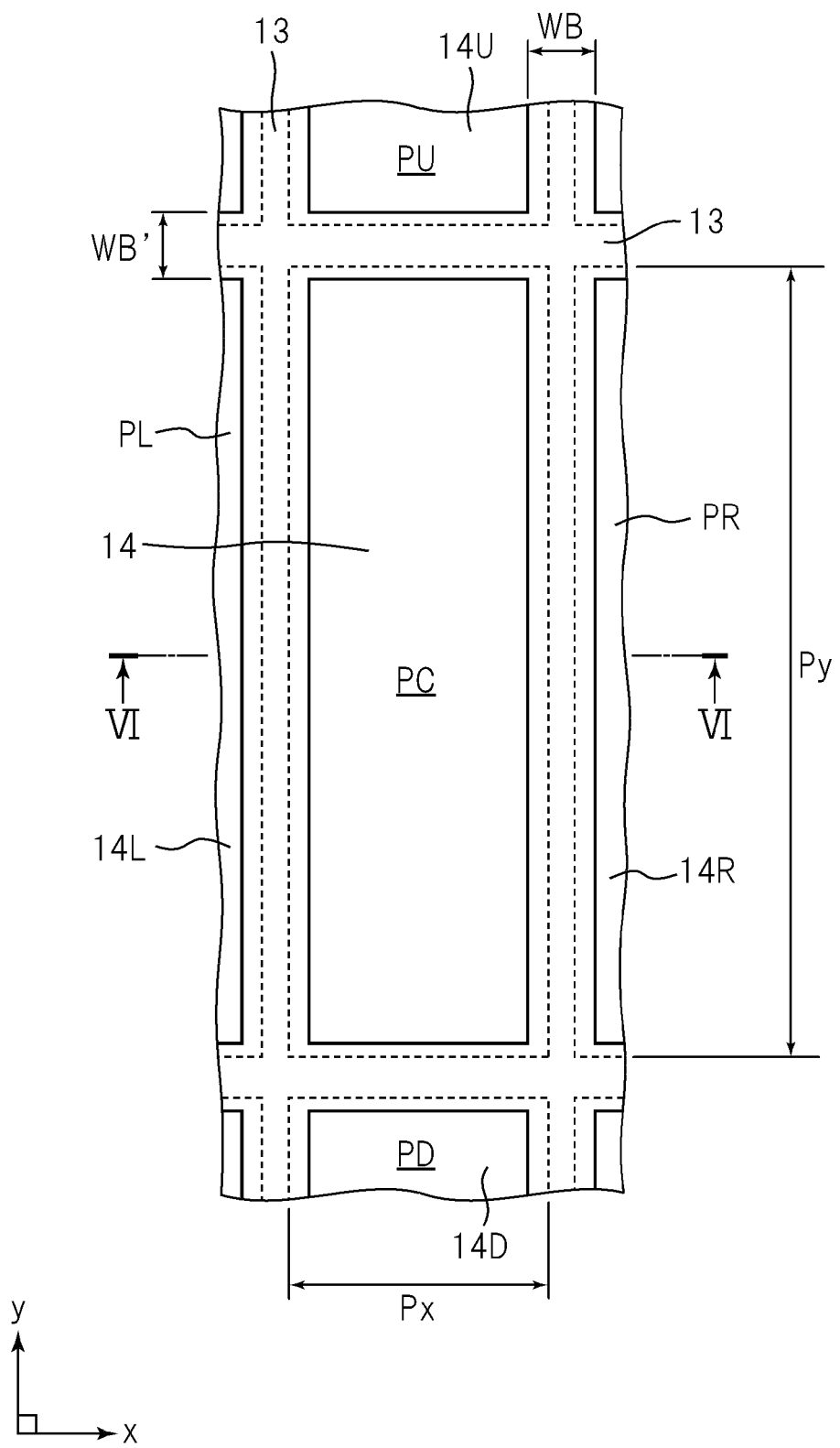
FIG. 4 is an explanatory view schematically illustrating, in plan view, an arrangement example of a main configuration of a color filter substrate according to the present invention.
Figure 5:
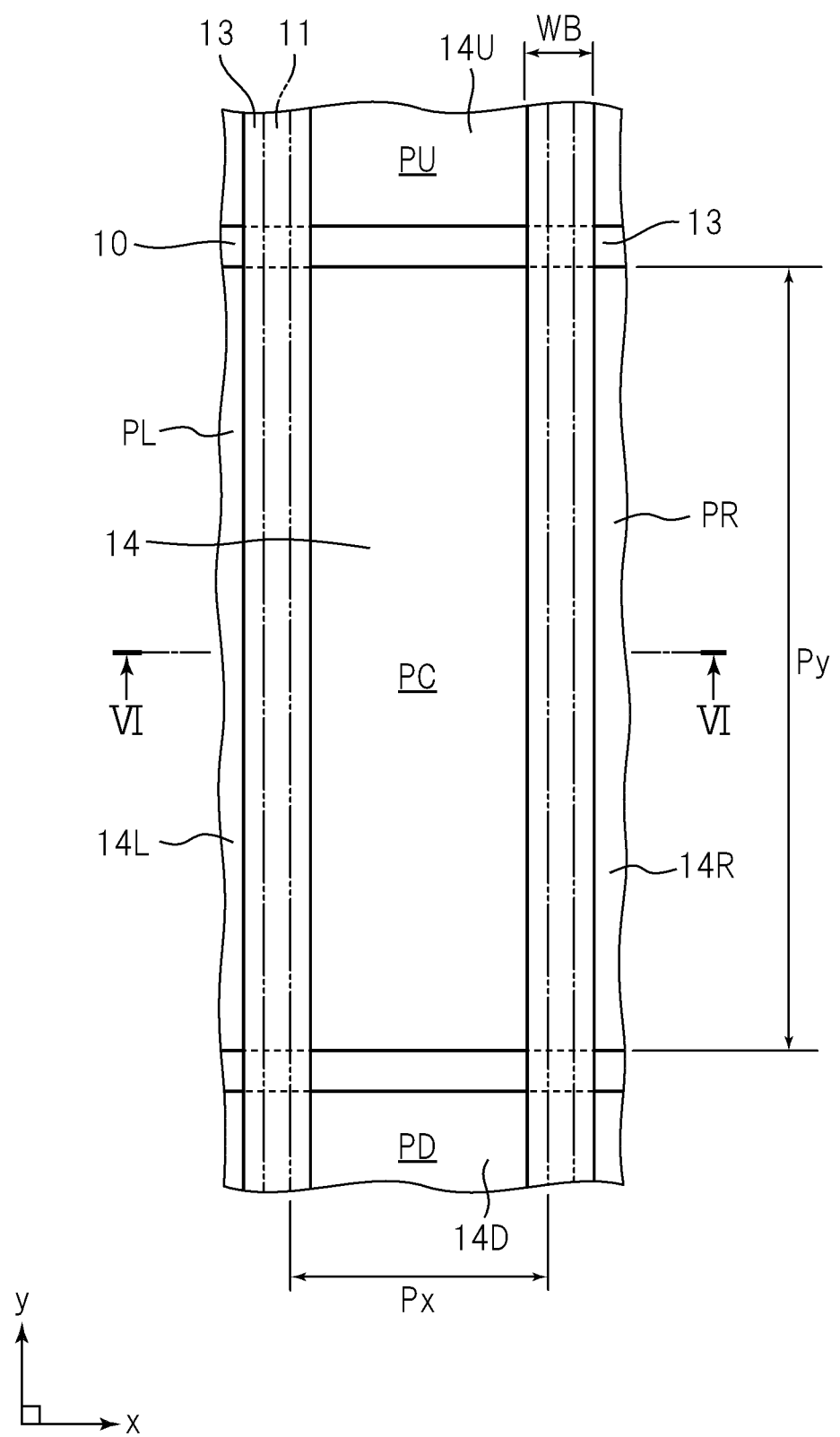
FIG. 5 is an explanatory view schematically illustrating, in plan view, another arrangement example of the main configuration of the color filter substrate according to the present invention.
Figure 11A:
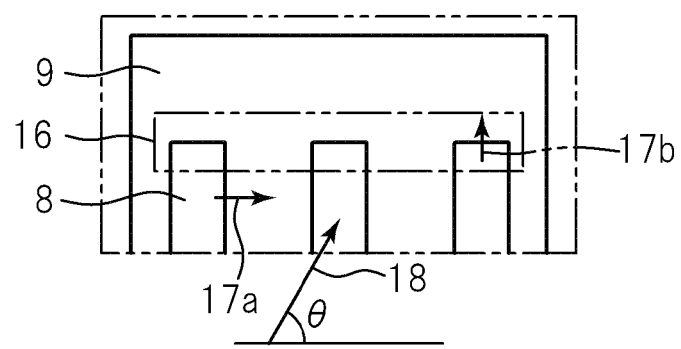
FIG. 11A is an explanatory view illustrating, in an enlarged manner, an arrangement example of the polymer structure in an end region of a pixel electrode surrounded by the broken line XI of FIG. 3.
Figure 11B:
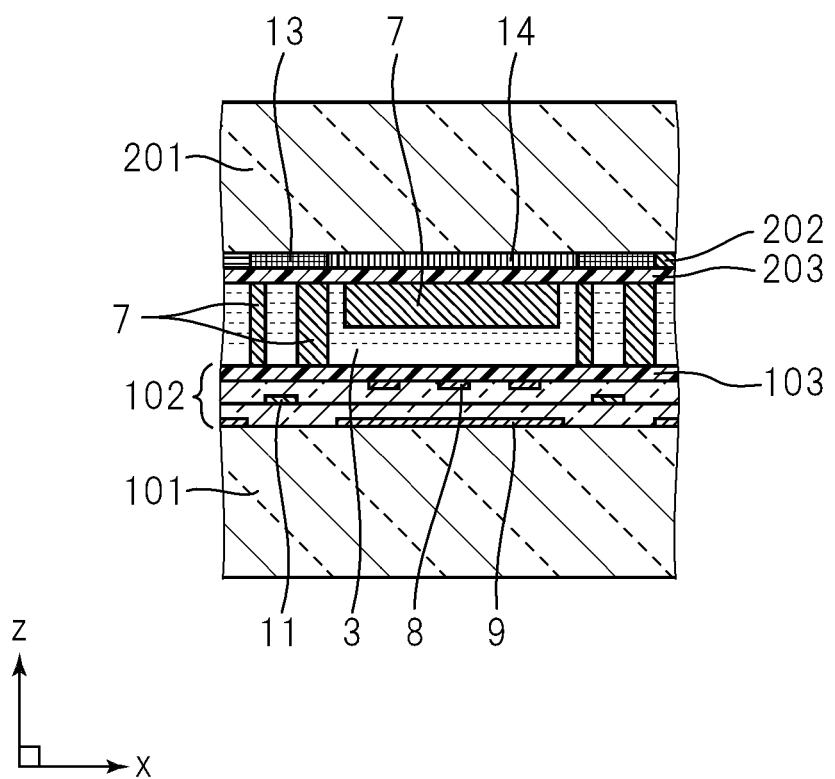
FIG. 11B is an explanatory view illustrating an example of a cross section of the liquid crystal display panel and arrangement of the polymer structures cut at the end region of the pixel electrode illustrated in FIG. 11A.
Figure 12:
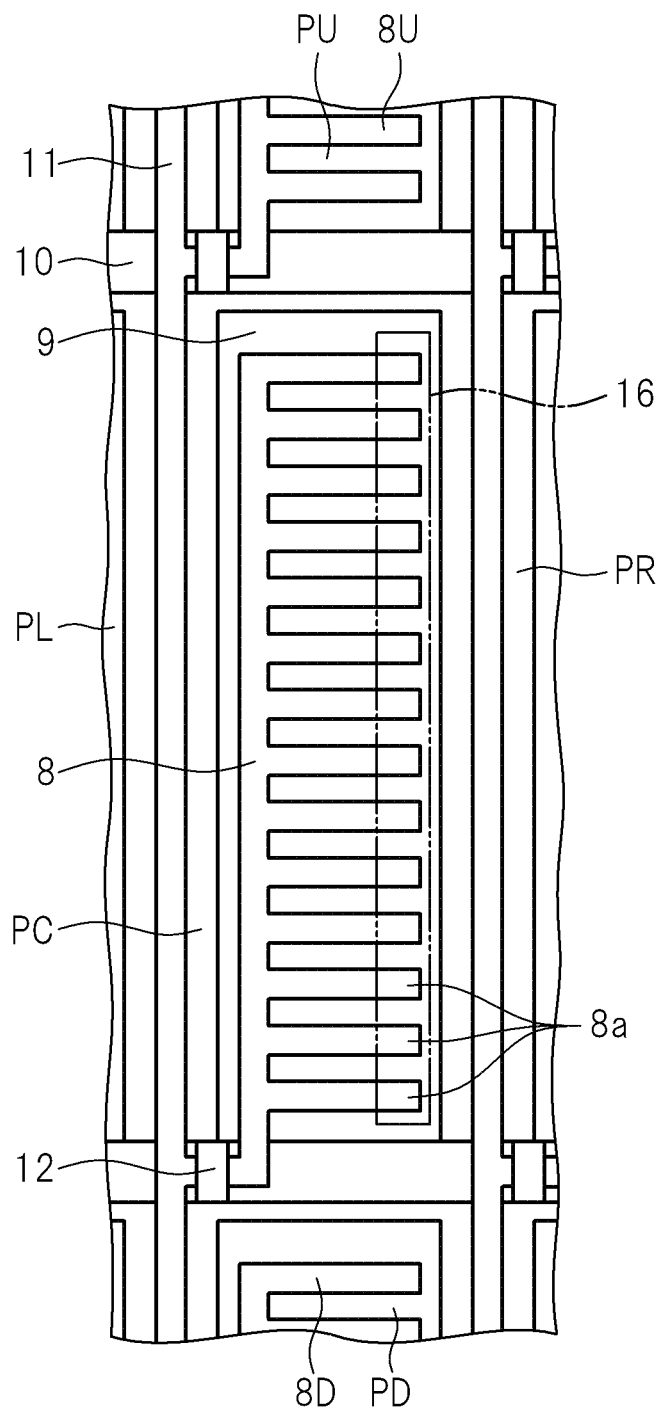
FIG. 12 is an explanatory view illustrating, in plan view, another example of arrangement of a main configuration of the TFT substrate and an end region of a pixel electrode according to the present invention.

FIG. 1 is a schematic plan view illustrating an example of a planar configuration of a liquid crystal display panel according to the present invention. FIG. 2 is a schematic cross-sectional view illustrating an example of a cross-sectional configuration at a position taken along the line II-II of FIG. 1. FIG. 3 is a schematic plan view illustrating an example of a planar configuration of a thin film transistor (TFT) substrate. FIGS. 4 and 5 are schematic plan views illustrating examples of a planar configuration of a color filter substrate. FIGS. 6 to 10 are each a cross-sectional view or a plan view illustrating an example of a cross-sectional configuration at a position taken along the line VI-VI of FIGS. 3 and 4 or the line VI-VI of FIG. 5 and an arrangement method of polymer structures. FIGS. 11A and 11B are a plan view and a cross-sectional view, respectively, illustrating an example of an arrangement method of the polymer structures at an electrode end portion. FIG. 12 is a plan view illustrating an example of an arrangement method of the polymer structure at an electrode end portion.

In this specification, as an example of the liquid crystal display device according to the present invention, a small-sized liquid crystal display device to be used for a cell-phone unit and the like is exemplified. Further, the present invention particularly relates to a configuration of the liquid crystal display panel in the liquid crystal display device. Therefore, in this specification, the configuration of the liquid crystal display panel and a manufacturing method therefor in the liquid crystal display device according to the present invention are described.

Note that, the basic configuration of the liquid crystal display panel according to the present invention may be the same as that of a conventional liquid crystal display panel. Therefore, in this specification, the feature parts of the liquid crystal display panel according to the present invention, that is, the configuration thereof and the manufacturing method therefor are mainly described, and specific description related to points which may be the same as the conventional configuration and manufacturing method is omitted. Further, there is assumed an active matrix type liquid crystal display panel.

The liquid crystal display panel according to the present invention includes, for example, as illustrated in FIGS. 1 and 2, a TFT substrate 1 (first substrate), a color filter substrate 2 (second substrate), a liquid crystal layer 3, sealing materials 4a and 4b, a first polarizing plate 5, a second polarizing plate 6, and a polymer structure 7. Further, in the liquid crystal display panel, a plurality of pixels each including a first electrode and a second electrode, one of the first electrode and the second electrode being a pixel electrode, are provided. That is, each of the plurality of pixels includes the first electrode and the second electrode for applying an electric field to the liquid crystal layer 3, and one of the first electrode and the second electrode is the pixel electrode.

The TFT substrate 1 includes a first insulating substrate 101, a first thin film laminate 102, and a first orientation film 103. The first insulating substrate 101 is, for example, a transparent insulating substrate such as a glass substrate. The first thin film laminate 102 includes, for example, a scanning signal line 10, a video signal line 11, a TFT element 12, a pixel electrode 8, and a plurality of insulating layers. The first orientation film 103 is made of, for example, an orientation-controlled polyimide layer obtained by, for example, rubbing processing of a surface thereof (interface with the liquid crystal layer 3). Note that, the first orientation film 103 may be an orientation film obtained by photo-orientation processing.

The color filter substrate 2 includes a second insulating substrate 201, a second thin film laminate 202, and a second orientation film 203. The second insulating substrate 201 is, for example, a transparent insulating substrate such as a glass substrate. The second thin film laminate 202 includes, for example, a black matrix 13, a color filter, and a planarizing layer. The second orientation film 203 is made of, for example, an orientation-controlled polyimide layer obtained by, for example, rubbing processing of a surface thereof (interface with the liquid crystal layer 3). Note that, the second orientation film 203 may be an orientation film obtained by photo-orientation processing.

In the liquid crystal display panel, as illustrated in FIGS. 1 and 2, the liquid crystal layer 3 is provided between the TFT substrate 1 and the color filter substrate 2. The TFT substrate 1 and the color filter substrate 2 are adhered to each other by the sealing material 4a surrounding a display region DA. The sealing material 4a has a filling opening for filling a liquid crystal composition to be used as the liquid crystal layer 3, and the filling opening is sealed by the sealing material 4b. That is, the liquid crystal layer 3 is filled between the TFT substrate 1 and the color filter substrate 2 by the sealing materials 4a and 4b. Further, although illustration is omitted, between the TFT substrate 1 and the color filter substrate 2, there is provided, for example, a spacer for obtaining uniform thickness of the liquid crystal layer 3 in each of the pixels.

Further, in the liquid crystal display panel according to the present invention, between the TFT substrate 1 and the color filter substrate 2, in addition to the liquid crystal layer 3 and the spacer, the polymer structure 7 is provided. The polymer structure 7 is provided for preventing an influence of liquid crystal orientation between the adjacent pixels. That is, the polymer structure 7 is provided for reducing or avoiding an influence caused by the liquid crystal orientation in one pixel of the adjacent pixels on liquid crystal orientation in another pixel thereof.

Further, the polymer structure 7 is formed in the liquid crystal layer between a signal line (video signal line or scanning signal line) and the pixel electrode 8. In the example illustrated in FIG. 2, the polymer structure 7 is provided in a region corresponding to the black matrix 13 of the color filter substrate 2 (region below the black matrix 13). That is, the polymer structure 7 is formed in a region overlapping with the black matrix. The polymer structure 7 is provided, for example, at all pixel boarder portions included in the display region DA. Note that, a dimension Px of FIG. 2 represents a dimension of one pixel in an x-axis direction.

Hereinafter, the configuration of each pixel and the shape and size of the polymer structure 7 are specifically described with reference to FIGS. 5 to 12.

As an example of the pixel configuration of the liquid crystal display panel according to the present invention, there is exemplified a pixel configuration in a case of an FFS mode, which is one type of an IPS mode. In the FFS mode liquid crystal display panel, similarly to the IPS mode liquid crystal display panel, the first electrode and the second electrode are provided on one of the first substrate and the second substrate. That is, in the example illustrated in FIGS. 1 and 2, the pixel electrode 8 and a common electrode 9 are both provided in the TFT substrate 1 (more specifically, in the first thin film laminate 102).

Note that, as illustrated in FIG. 3, the liquid crystal display panel includes the scanning signal line 10 and the video signal line 11. The width of the scanning signal line 10 and the width of the video signal line 11 are represented by WG and WS, respectively. A distance Px between two adjacent video signal lines 11 corresponds to the dimension of a region in which one pixel is provided in the x-axis direction. A distance Py between two adjacent scanning signal lines 10 corresponds to a dimension of the region in which one pixel is provided in a y-axis direction. Note that, FIG. 3 schematically illustrates, in plan view, a configuration of one pixel PC and a vicinity thereof, and the relationship between the dimension in the x-axis direction and the dimension in the y-axis direction does not necessarily match with that in the actual liquid crystal display device.

Further, each of the pixels of the liquid crystal display panel includes the TFT element 12 including, for example, a gate electrode connected to one scanning signal line 10, first source and drain electrodes connected to one video signal line 11, and second source and drain electrodes connected to the pixel electrode 8.

As illustrated in FIG. 3, in each of the pixels, a region in which liquid crystal is driven depends on sizes of the pixel electrode 8 and the common electrode 9. Therefore, it is understood that, in order to improve the transmittance of the liquid crystal display device, it is effective to increase the size of the electrode group. However, as described above, an effort is necessary to suppress an influence caused by the liquid crystal orientation in one pixel of the adjacent pixels on the liquid crystal orientation in another pixel thereof.

In the example illustrated in FIG. 3, the pixel electrode 8 is formed into a comb shape having a plurality of comb tooth portions 8a. Specifically, as illustrated in FIG. 3, the plurality of comb tooth portions 8a of the pixel electrode 8 have a band shape with its longitudinal direction corresponding to the y-axis direction, which is the extending direction of the video signal line 11, and those comb tooth portion 8a are arranged in the x-axis direction, which is the extending direction of the scanning signal line 10.

In this case, an electric field direction 17a applied to the liquid crystal layer 3 by giving a potential difference between the pixel electrode 8 and the common electrode 9 is mainly the x-axis direction as illustrated in FIG. 11A. Therefore, in the liquid crystal display panel including such a pixel, for example, an orientation direction 18 of the liquid crystal layer 3 obtained when no electric field is applied is set to a direction inclined by an angle θ from the electric field direction 17a (x-axis direction). Note that, the angle θ formed between the orientation direction 18 of the liquid crystal layer 3 obtained when no electric field is applied and the electric field direction 17a is, for example, about 70 degrees to 85 degrees.

However, as illustrated in FIG. 11A, in a region (end region) 16 including end portions of the pixel electrode 8, an electric field direction 17b is the y-axis direction. Therefore, in the end region 16 of the pixel electrode 8, a so-called disclination is generated, which causes decrease in transmittance.

Therefore, in the liquid crystal display device according to the present invention, the polymer structure 7 may be further formed in the end region 16 of the pixel electrode 8. That is, in the example illustrated in FIG. 11A, the polymer structure 7 is formed in a region across the leading end portions of the plurality of the comb tooth portions 8a of the pixel electrode 8.

FIG. 11B is a cross-sectional view of the end region 16 illustrated in FIG. 11A. As illustrated in FIGS. 11A and 11B, the polymer structure 7 is formed in the end region 16 across the leading end portions of the plurality of the comb tooth portions 8a of the pixel electrode 8.

Note that, FIGS. 4 and 5 illustrate, in plan view, a main configuration of the color filter substrate 2, which is opposed to the TFT substrate 1 illustrated in FIG. 3. As illustrated in FIGS. 4 and 5, in the color filter substrate 2, the black matrix 13 is formed at a position corresponding to the scanning signal line 10 and the video signal line 11 which are illustrated in FIG. 3. That is, a colored layer 14 of the center pixel PC and colored layers 14L, 14R, 14U, and 14D of other respective adjacent pixels PL, PR, PU, and PD are separated from each other by the lattice-shaped black matrix 13. The width of the black matrix 13 is represented by WB.

Figure 6:
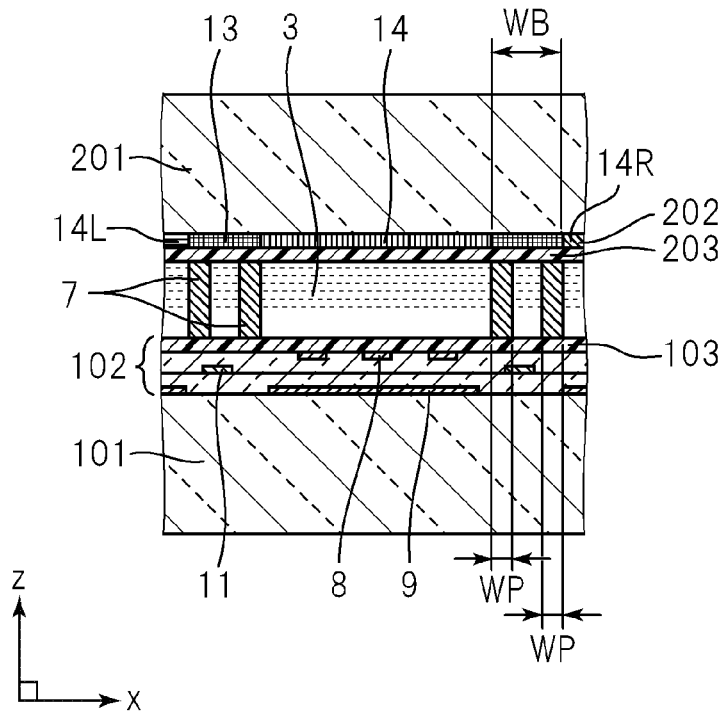
FIG. 6 is an explanatory view illustrating an example of a cross section of the liquid crystal display panel and arrangement of polymer structures at a position taken along the line VI-VI of FIGS. 3 and 4.
Figure 7:
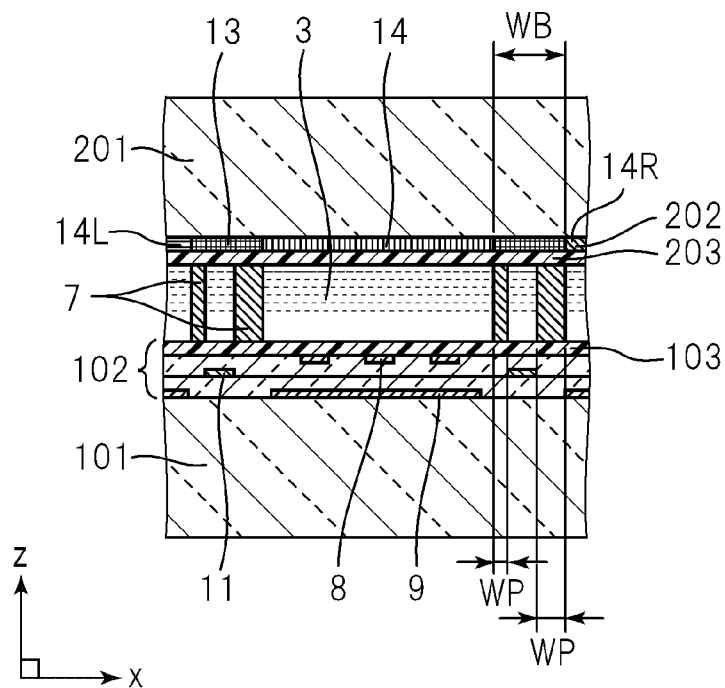
FIG. 7 is an explanatory view illustrating another example of the cross section of the liquid crystal display panel and the arrangement of the polymer structures at the position taken along the line VI-VI of FIGS. 3 and 4.

FIGS. 6 and 7 are cross-sectional views illustrating a position taken along the line VI-VI of FIG. 3. FIGS. 6 and 7 are also cross-sectional views illustrating a position taken along the line VI-VI of FIG. 4 or 5.

As illustrated in FIG. 6, the position of the polymer structure 7 is not particularly limited as long as the polymer structure 7 is positioned between the video signal line 11 and the pixel electrode 8. It suffices that a width WP of the polymer structure 7 be within a range of a difference between the width WB of the black matrix 13 and the width of the signal line (width WS of the video signal line 11 or width WG of the scanning signal line 10). That is, in a cross section illustrated in FIG. 6, which takes along the short side of the polymer structure 7, the width WP of the polymer structure 7, the width WB of the black matrix 13, and the width of the signal line (width WS of the video signal line 11 or width WG of the scanning signal line 10) are set so as to satisfy a condition of the following Expression (1).

$$WP \leq (WB - WS) \text{ or } WP \leq (WB - WG) \qquad \text{Expression (1)}$$

FIG. 6 illustrates a case where the widths WP of the polymer structures 7 on the right and left sides of the video signal line 11 are substantially the same. However, the position of the polymer structure 7 is not particularly limited as long as the polymer structure 7 is positioned within a range between the adjacent pixel electrodes 8. Therefore, the polymer structure 7 may be formed at a position at which the polymer structure 7 overlaps with a vertical line of the black matrix 13 while being offset from the black matrix 13.

Further, although the polymer structure 7 is formed between the video signal line 11 and the pixel electrode 8 as illustrated in FIG. 7, FIG. 7 illustrates a case where the widths WP of the polymer structures 7 on the right and left sides of the video signal line 11 are asymmetry. Also in this case, the polymer structure 7 may be formed at a position at which the polymer structure 7 overlaps with the vertical line of the black matrix 13 while being offset from the black matrix 13.

That is, in both FIGS. 6 and 7, in plan view, the polymer structures 7 extend along edges of a part of the video signal line 11 so as to sandwich the part of the video signal line 11. Each of the two polymer structures 7, which is formed from one substrate of the TFT substrate 1 and the color filter substrate 2 toward the other substrate thereof, is provided so as to overlap with any one of the regions surrounded by the signal lines on its inner side (in x direction of the pixel: Px). Between the two adjacent polymer structures 7, the liquid crystal layer 3 is provided.

Figure 8:
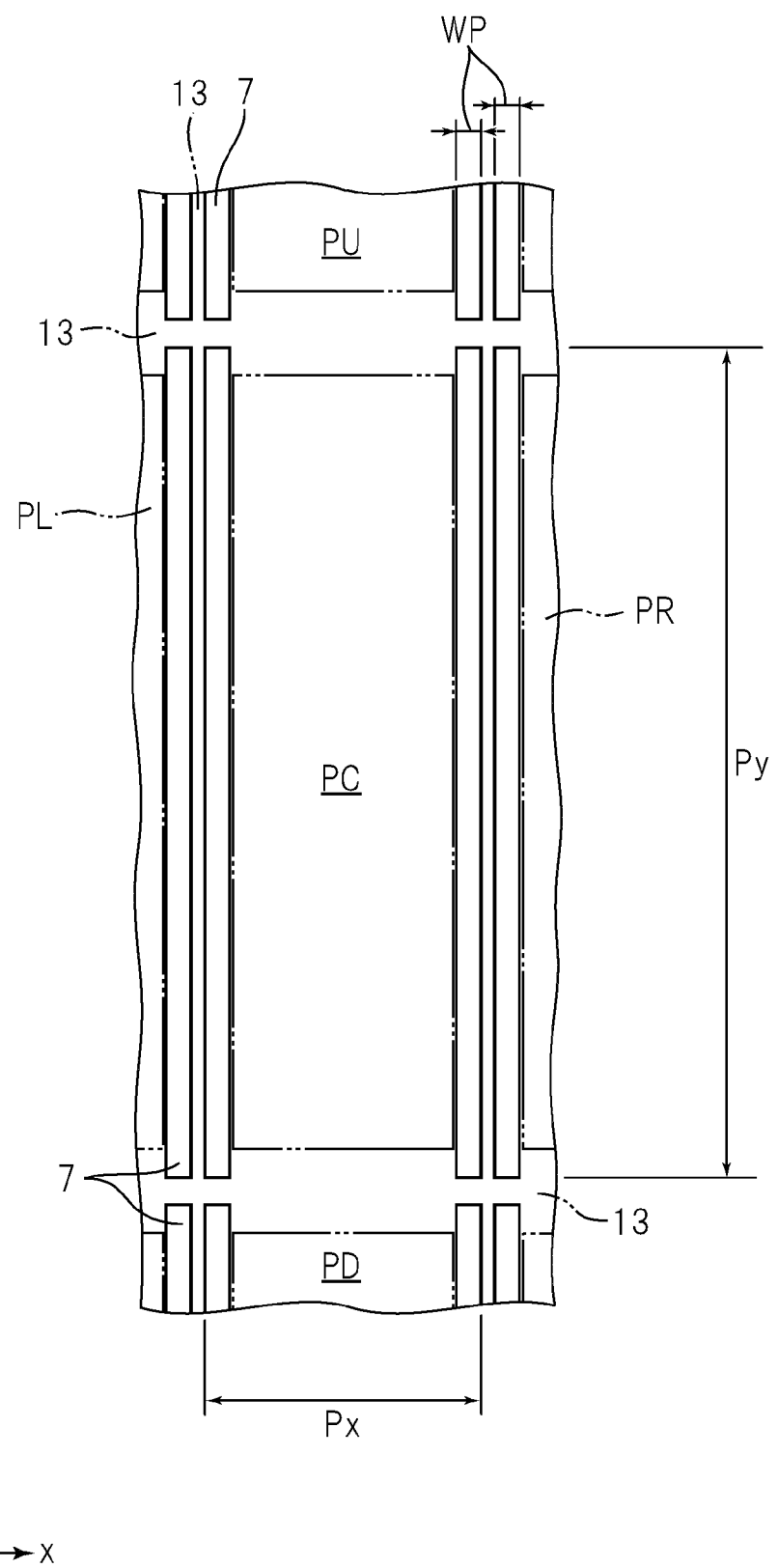
FIG. 8 is an explanatory view illustrating, in plan view, an arrangement example of the polymer structures formed in a black matrix region.

Specifically, FIG. 8 illustrates two linear polymer structures 7 parallel to each other, which are each formed between the pixel electrode 8 (not shown) and the video signal line 11 (not shown) below the black matrix 13, which separates the center pixel PC and the adjacent pixels PL and PR on both sides (x direction in FIG. 8) of the pixel electrode of the pixel PC. FIG. 8 illustrates the case where the widths WP of the polymer structures 7 are substantially the same. Also in this case, the polymer structure 7 may be formed at a position at which the polymer structure 7 overlaps with the vertical line (y direction in FIG. 8) of the black matrix 13 while being offset from the black matrix 13.

That is, in plan view, the polymer structures 7 extend along edges of the video signal line 11 so as to sandwich a part of the video signal line 11. Each of the two polymer structures 7, which is formed from one substrate of the TFT substrate 1 and the color filter substrate 2 toward the other substrate thereof, is provided so as to overlap with any one of the regions surrounded by the signal lines on its inner side (in x direction of the pixel: Px). Between the two adjacent polymer structures 7, the liquid crystal layer 3 is provided.

Further, as illustrated in FIG. 8, the region surrounded by the signal lines (video signal lines and scanning signal lines) has a rectangular shape. The polymer structures 7 are formed so as to overlap with two opposing sides out of four sides representing the border among the rectangular regions.

Figure 9:
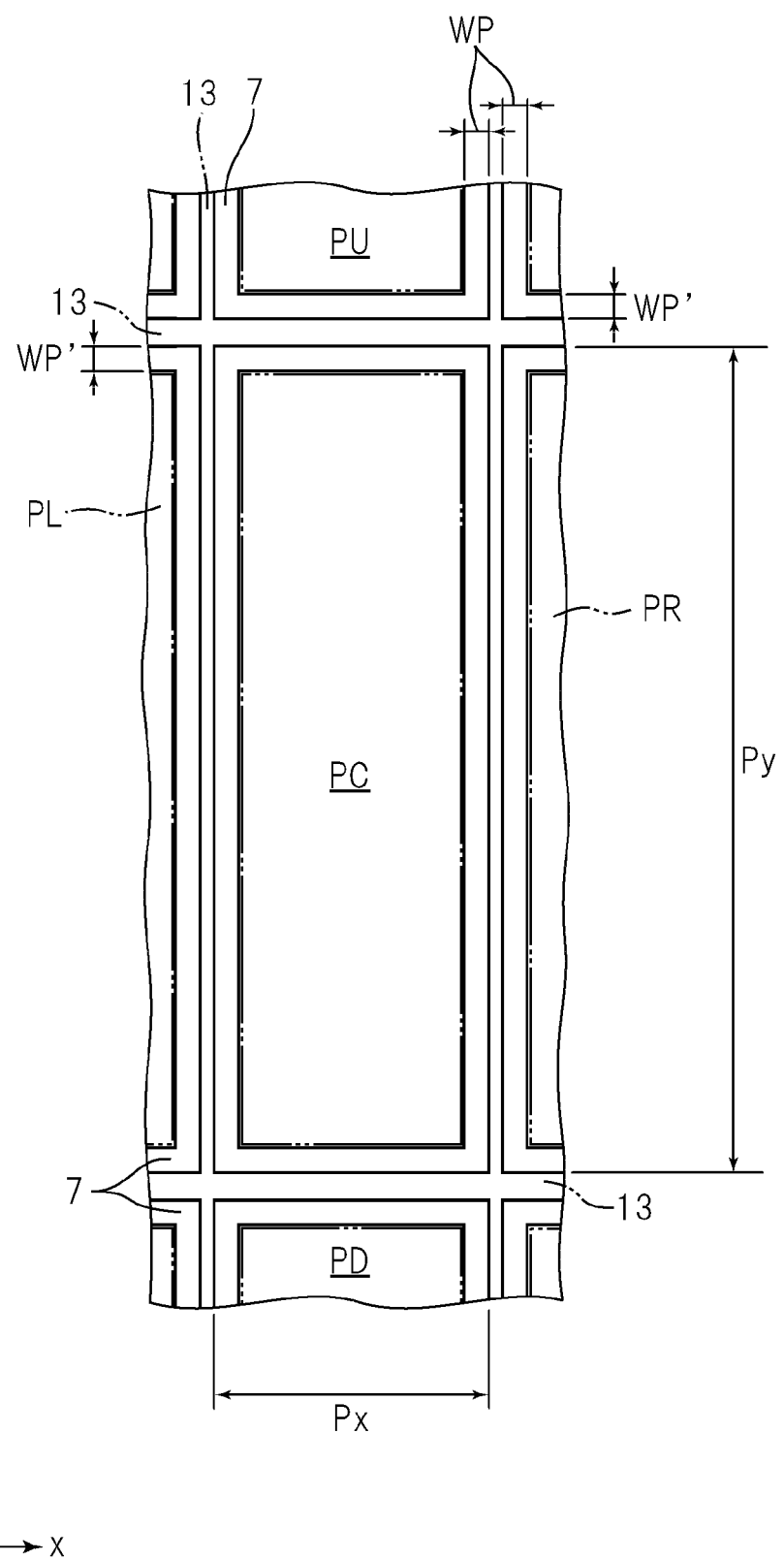
FIG. 9 is an explanatory view illustrating, in plan view, another arrangement example of the polymer structures formed in the black matrix region.

Further, FIG. 9 illustrates two linear polymer structures 7 parallel to each other, which are each formed between the pixel electrode 8 (not shown) and the video signal line 11 (not shown) below the black matrix 13, which separates the center pixel PC and the adjacent pixels PL and PR on both sides (x direction in FIG. 9) of the pixel electrode of the pixel PC. Further, FIG. 9 illustrates two linear polymer structures 7 parallel to each other, which are each formed between the pixel electrode 8 (not shown) and the scanning signal line 10

(not shown) below the black matrix 13, which separates the center pixel PC and the adjacent pixels PU and PD on upper and lower sides, respectively, (y direction in FIG. 9) of the pixel electrode of the pixel PC. FIG. 9 illustrates the case where the widths WP of the polymer structures 7 are substantially the same. Also in this case, the polymer structure 7 may be formed at a position at which the polymer structure 7 overlaps with the vertical line (y direction in FIG. 9) of the black matrix 13 while being offset from the black matrix 13.

That is, in plan view, the polymer structures 7 extend along edges of each of the video signal line 11 and the scanning signal line 10 so as to sandwich a part of the each of the video signal line 11 and the scanning signal line 10. At least two polymer structures 7, which are formed from one substrate of the TFT substrate 1 and the color filter substrate 2 toward the other substrate thereof, are provided so as to overlap with any one of the regions surrounded by the signal lines on its inner side (in x direction of the pixel: Px, and in y direction of the pixel: Py). Between the two adjacent polymer structures 7, the liquid crystal layer 3 is provided.

Further, as illustrated in FIG. 9, the region surrounded by the signal lines (video signal lines and scanning signal lines) has a rectangular shape. The polymer structures 7 are formed to have a rectangular shape so as to overlap with four sides representing the border of the region surrounded by the signal lines (video signal lines and scanning signal lines).

Figure 10:
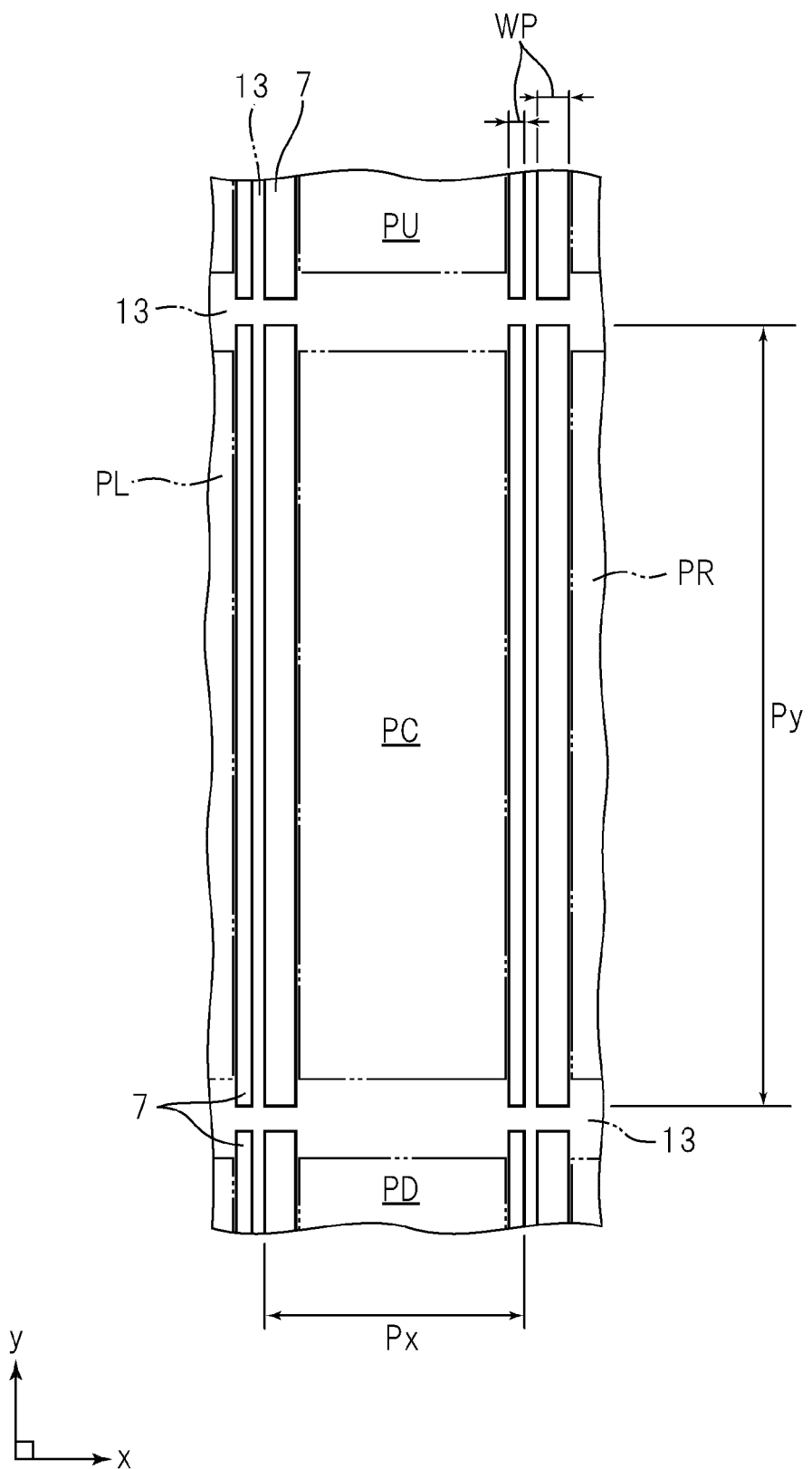
FIG. 10 is an explanatory view illustrating, in plan view, still another arrangement example of the polymer structures formed in the black matrix region.

FIG. 10 illustrates two linear polymer structures 7 parallel to each other, which are each formed between the pixel electrode 8 (not shown) and the video signal line 11 (not shown) below the black matrix 13, which separates the center pixel PC and the adjacent pixels PL and PR on both sides (x direction in FIG. 10) of the pixel electrode of the pixel PC. However, FIG. 10 illustrates the case where the widths WP of the polymer structures 7 are asymmetry, unlike the case illustrated in FIG. 8. Also in this case, the polymer structure 7 may be formed at a position at which the polymer structure 7 overlaps with the vertical line (y direction in FIG. 10) of the black matrix 13 while being offset from the black matrix 13.

That is, in plan view, the polymer structures 7 extend along edges of the video signal line 11 so as to sandwich a part of the video signal line 11. Each of the two polymer structures 7, which is formed from one substrate of the TFT substrate 1 and the color filter substrate 2 toward the other substrate thereof, is provided so as to overlap with any one of the regions surrounded by the signal lines (in x direction of the pixel: Px). Between the two adjacent polymer structures 7, the liquid crystal layer 3 is provided.

In this case, the region surrounded by the signal lines (video signal lines and scanning signal lines) has a rectangular shape. The polymer structures 7 are formed so as to overlap with two opposing sides out of four sides representing the border among the rectangular regions.

FIG. 12 illustrates a position where the polymer structure 7 is formed in the liquid crystal display device in a case where the plurality of comb tooth portions 8a of the pixel electrode 8 formed in a comb shape are parallel to the scanning signal line 10. Also in the example illustrated in FIG. 12, the polymer structure 7 can be formed in the end region 16 across the leading end portions of the plurality of comb tooth portions 8a of the pixel electrode 8. The position where the polymer structure 7 is formed in the pixel is not particularly limited as long as the position includes the end region 16 of the pixel electrode 8.

Further, the liquid crystal layer 3 may contain a polymer for the purpose of so-called polymer stabilization. That is, in this case, the liquid crystal layer 3 contains a polymer other than the polymer structure 7, and the density of the polymer structure 7 is higher than the density of the polymer contained in the liquid crystal layer 3. When the liquid crystal layer further contains a polymer having a lower density than that of the polymer structure 7, in the liquid crystal layer 3, a polymer network for polymer stabilization, which has a relatively low density, is formed. At the same time, in a specific region of one substrate, the polymer structure 7 for preventing influence of liquid crystal orientation between pixels described above, which has a relatively high density, is formed.

As a method of forming the polymer structure 7 according to the present invention, it is preferred to employ a method of forming the polymer structure 7 by polymerizing a polymerizable monomer contained in the liquid crystal composition. Specifically, in this case, a manufacturing method for a liquid crystal display device according to the present invention includes a step of filling the liquid crystal layer 3 between the first substrate (TFT substrate 1) and the second substrate (color filter substrate 2), and in this step, a liquid crystal composition in which a polymerizable monomer is contained in host liquid crystal, the liquid crystal composition being used as the liquid crystal layer 3, is filled between the first substrate and the second substrate, and then, the polymerizable monomer is polymerized to form the polymer structure 7 between the adjacent pixel electrodes 8.

The liquid crystal layer 3 corresponds to a liquid crystal composition containing a liquid crystal material and few types of additives. In the liquid crystal composition, the content of the polymerizable monomer used for forming the polymer structure 7 (proportion of the polymerizable monomer relative to the total weight of the liquid crystal composition constituting the liquid crystal layer 3) may be, for example, 2.0 wt % or less, preferably 1.5 wt % or less.

Further, at this time, the content of the polymerizable monomer is more preferably 1.0 wt % or less. However, in order to obtain the effects of the present invention, the content of the polymerizable monomer is required to be 0.5 wt % or more. The content of the polymer structure 7 in the liquid crystal layer 3, which is to be finally formed in the liquid crystal display device, is similarly in the range of 0.5 wt % to 2.0 wt %.

In this case, the content of the liquid crystal material in the liquid crystal layer 3 (proportion of the liquid crystal material relative to the total weight of the liquid crystal composition constituting the liquid crystal layer 3) may be, for example, from 98.0 wt % to 99.5 wt %. Note that, as the liquid crystal material contained in the liquid crystal composition, it is preferred to use a nematic liquid crystal material.

When the polymer structure 7 is formed by polymerizing the polymerizable monomer contained in the liquid crystal layer 3, the liquid crystal composition containing the polymerizable monomer is filled between the TFT substrate 1 and the color filter substrate 2, and then, the polymerizable monomer is polymerized in the filled liquid crystal composition, to thereby form the polymer structure 7.

Here, as the polymerizable monomer, it is preferred to use, for example, a photo-polymerizable monomer which may be polymerized by light irradiation. That is, it is preferred to use, for example, a photo-polymerizable monomer having at least two functional groups. Specifically, it is preferred to use a derivative having one or both of an acryl-group and a methacryl-group as the functional groups at both terminals of a main skeleton structure containing an aromatic ring.

Further, for formation of the polymer structure 7, for example, a polymerizable monomer having liquid crystallinity may also be used. In this case, the liquid crystal material contains host liquid crystal and a polymerizable monomer having liquid crystallinity. With the use of the polymerizable monomer having liquid crystallinity, it is possible to enhance the effect of stabilizing the liquid crystal material by the polymer structure 7. As the polymerizable monomer, one type of those described above may be used alone, or two or more types may be used in combination.

When the photo-polymerizable monomer is used, the polymer structure 7 is formed by polymerizing the photo-polymerizable monomer contained in the liquid crystal composition by applying light satisfying a predetermined condition to the liquid crystal composition filled between the TFT substrate 1 and the color filter substrate 2.

That is, first, the TFT substrate 1, the color filter substrate 2, and the liquid crystal composition containing the liquid crystal material and the photo-polymerizable monomer are prepared. Next, the TFT substrate 1 and the color filter substrate 2 are adhered to each other, and then the liquid crystal composition is filled between the TFT substrate 1 and the color filter substrate 2.

Further, when the photo-polymerizable monomer is polymerized, it is preferred to use a photo-initiator. The photo-initiator is not particularly limited as long as the photo-initiator effectively promotes the polymerization of the photo-polymerizable monomer with the light irradiation to the liquid crystal composition, and arbitrary types of photo-initiators may be selected and used as needed. That is, for example, it is preferred to use a photo-initiator which generates free radicals by ultraviolet irradiation to effectively accelerate the radical polymerization of the photo-polymerizable monomer.

Examples of the photo-initiator which may be used include 9-fluorenone, 1-hydroxycyclohexyl phenyl ketone, dibenzosuberone, 2-hydroxy-2-methylpropiophenone, benzoin, 2-benzoylbenzoic acid, 4-benzoylbenzoic acid, 2,2-diethoxyacetophenone, benzoin isobutyl ether, benzoin isopropyl ether, acetophenone, 2,2-diethoxyphenylacetophenone, benzoin ethyl ether, benzoin methyl ether, camphorquinone, 2,2-dimethoxy-2-phenylacetophenone, 2-chlorobenzophenone, 2-ethylanthraquinone, 4,4'-dichlorobenzophenone, 4-chlorobenzophenone, benzil, benzophenone, methyl 2-benzoylbenzoate, and p-anisil.

In order to form the polymer structure 7 between the pixel electrode and the signal line, which are provided between the pair of adhered substrates 1 and 2, for example, there may be employed a method of performing exposure of ultraviolet light with the use of an ultraviolet irradiation apparatus from the TFT substrate side via a photomask having a predetermined shape. When the photomask is shaped so that light is transmitted only at a portion of the black matrix 13 illustrated in FIG. 4 or 5, the shape of the polymer structure 7 according to the present invention can be obtained.

More specifically, the video signal line 11 and the scanning signal line 10 are each formed of a colored metal such as chrome (Cr) and aluminum (Al), which does not transmit light. Therefore, by using a photomask shaped so that light is transmitted only at the portion of the black matrix 13 illustrated in FIG. 4 as described above, because the video signal line 11 and the scanning signal line 10 play a role as a photomask, the polymer structure 7 illustrated in FIG. 9 can be obtained. Meanwhile, by using a photomask shaped so that light is transmitted only at the portion of the black matrix 13 illustrated in FIG. 5 as described above, because the video signal line 11 plays a role as a photomask, the polymer structure 7 illustrated in FIG. 8 or 10 can be obtained.

As described above, in the manufacturing method for a liquid crystal display device according to the present invention, through ultraviolet irradiation with the use of a photomask, the polymer structure 7 may be formed between the signal line and the pixel electrode which are provided on the TFT substrate 1 or the color filter substrate 2. It could be said that a photomask requiring particularly high resolution is unnecessary. Therefore, according to the present invention, it is possible to provide a liquid crystal display device which has high transmittance and high production efficiency, and a manufacturing method therefor.

Further, in the liquid crystal composition, in addition to the forming of the polymer structure 7, adding of a polymerizable monomer may be carried out for the purpose of so-called polymer stabilization. In this case, the liquid crystal layer 3 contains a polymer other than the polymer structure 7, and the density of the polymer structure 7 is higher than that of the polymer contained in the liquid crystal layer 3.

That is, in the liquid crystal layer 3, a polymer network for polymer stabilization, which has a relatively low density, is formed. At the same time, in a specific region of one substrate, the polymer structure 7 described above is formed.

Next, specific examples of the liquid crystal display panel according to the present invention are described.

Example 1

In Example 1, a specific formation method and function effects thereof when the polymer structure 7 is provided in the FFS mode liquid crystal display panel, which is one type of the IPS mode liquid crystal display panel, are described.

Note that, in Example 1, a liquid crystal display panel having a plane dimension of 100 mm (longer side)×100 mm (shorter side) and a diagonal dimension of about 6 inches was manufactured. The thickness of the glass substrate of the liquid crystal display panel was set to 1.1 mm. Further, the size of one pixel (Py×Px) was set to 600 μm×200 μm. In the liquid crystal display panel, the first insulating substrate 101 and the second insulating substrate 201 were each formed of a transparent glass substrate whose surfaces had been polished.

Then, on the first insulating substrate 101 corresponding to one of the glass substrates, as illustrated in FIG. 6, the first thin film laminate 102 including the scanning signal line, the video signal line, the TFT element, the pixel electrode, the common electrode, and the insulating layers, and the first orientation film 103 were formed, to thereby constitute the TFT substrate 1. The width WG of the scanning signal line and the width WS of the video signal line were set to be the same, that is, 20 μm. The width of the short side of the common electrode was set to 160 μm, the number of the comb tooth portions of the pixel electrode was set to four, the widths of the lines of the comb tooth portions and the spaces therebetween were each set to 20 μm, and the entire width of the pixel electrode was set to 140 μm.

On the second insulating substrate 201 corresponding to another of the glass substrates, the second thin film laminate 202 including the black matrix, the colored layer, and the planarizing layer, and the second orientation film 203 were formed, to thereby constitute the color filter substrate 2. The width WB of the black matrix 13 was set to 40 μm.

At this time, as the material that constituted the first orientation film 103 and the second orientation film 203, polyimide was employed. That is, first, a polyimide resin precursor was applied using a printing machine and then baked, to thereby form a polyimide film having a thickness of 0.07 μm to 0.1 μm.

After that, the surface of the polyimide film was subjected to orientation processing to control orientation of the liquid crystal material contained in the liquid crystal layer 3. In this manner, the first orientation film 103 and the second orientation film 203 were formed. The orientation processing was performed by using a rubbing machine having buffing cloth made of rayon as a rubbing roll. A rubbing angle was set to 15 degrees with respect to the comb tooth direction of the pixel electrode, and the rubbing was performed in parallel between the pair of substrates 1 and 2.

The TFT substrate 1 and the color filter substrate 2 were adhered to each other via the sealing material 4a illustrated in FIG. 1. That is, an appropriate amount of polymer beads was mixed into a sealing agent made of an epoxy resin to prepare a composite sealing agent, and the composite sealing agent was printed on one of the substrates using a seal mask, to thereby form the sealing material 4a. After that, the composite sealing agent constituting the sealing material 4a was temporarily cured, to thereby combine the TFT substrate 1 and the color filter substrate 2. After that, the sealing material 4a was completely cured while pressing the pair of substrates using a press.

At this time, inside a space (panel portion) surrounded by the TFT substrate 1, the color filter substrate 2, and the sealing material 4a, the spherical polymer beads were interposed as a spacer, and a gap (thickness d) with the liquid crystal composition filled therein was adjusted to be 4.5 μm. Further, at this time, a width of a liquid crystal filling opening provided in the sealing material 4a, for filling the liquid crystal composition into the panel portion, was set to 10 mm.

Meanwhile, as the liquid crystal composition used for formation of the liquid crystal layer 3 and the polymer structure 7, a liquid crystal composition A containing a polymerizable monomer, an initiator, and a liquid crystal material was prepared. As the polymerizable monomer, a bifunctional acrylic monomer was used. As the initiator, 2,2-diethoxyphenyl-acetophenone (IRGACURE 651: NAGASE & CO., LTD), which dissolves in liquid crystal, was used. As the liquid crystal material, fluorine nematic liquid crystal composition was used. Note that, the weight percentages of the polymerizable monomer, the initiator, and the liquid crystal material in the liquid crystal composition A were 0.5 wt %, 0.05 wt %, and 99.45 wt %, respectively.

Next, the liquid crystal composition A was filled into the space surrounded by the TFT substrate 1, the color filter substrate 2, and the sealing material 4a. That is, the liquid crystal display panel was disposed in a sealable container (not shown) with the liquid crystal filling opening facing downward. Then, the liquid crystal composition A was poured in a liquid crystal dish which was connected to a lifting device provided outside the container. Note that, the liquid crystal composition A was held in a slightly protruded state within the liquid crystal dish.

Outside the container, a pipe connected to a vacuum pump and a Pirani gauge was provided. The vacuum pump was operated, and an exhaust gas volume was adjusted using an adjustment valve while monitoring the Pirani vacuum gauge. The exhausting was performed for 120 minutes until the degree of vacuum reached 5 Pa so that the container was put into a low-pressure state.

Subsequently, the lifting device was operated so that the liquid crystal filling opening was dipped into the liquid crystal composition A. After that, nitrogen or air was introduced into the container by closing the adjustment valve and opening an adjustment valve of a leak pipe. In this manner, the liquid crystal composition A was filled into the space surrounded by the TFT substrate 1, the color filter substrate 2, and the sealing material 4a. After the filling was completed, the liquid crystal filling opening was sealed by the sealing material 4b made of an ultraviolet curing agent (acrylic resin).

After that, while using the photomask shaped so that light was transmitted only at the portion of the black matrix 13 illustrated in FIG. 4, ultraviolet light was applied from the TFT substrate 1 side. Thus, a polymer structure forming step of polymerizing the polymerizable monomer in the liquid crystal composition was carried out. The irradiation amount of ultraviolet light, which was transmitted through the photomask shaped so that ultraviolet light was transmitted only at the portion of the black matrix 13 illustrated in FIG. 4, was 15 J in total at 365 nm. The polymerizing operation was carried out several times. In this manner, the liquid crystal display panel including the liquid crystal layer 3 and the polymer structure 7, which were formed by using the liquid crystal composition A, was manufactured.

Note that, three comparative panels were prepared. In a comparative panel A, only the electrode configuration was changed, and other configurations were not changed. The electrode configuration of the comparative panel A was set as follows. That is, the width of the short side of the common electrode was set to 120 μm, the number of the comb tooth portions of the pixel electrode was set to three, the widths of the lines of the comb tooth portions and the spaces therebetween were each set to 20 μm, and the entire width of the pixel electrode was set to 100 μm.

In a comparative panel B, only the ultraviolet irradiation condition and the rubbing angle were changed, and other configurations were not changed. In the comparative panel B, ultraviolet light was not applied, and further, the rubbing angle was set to 60 degrees with respect to the comb tooth direction of the pixel electrode, and the rubbing was performed in parallel between the pair of substrates 1 and 2.

In a comparative panel C, only the ultraviolet irradiation condition was changed, and other configurations were not changed. In the comparative panel C, a step of applying ultraviolet light was not carried out.

Then, the transmittance was evaluated in the liquid crystal display panel and the comparative panels manufactured as described above. The transmittance was evaluated with reference of the ratio between the incident light and the outgoing light. In this example, the liquid crystal orientation giving the maximum transmittance was realized in the comparative panel B, and hence assuming that the transmittance of the comparative panel B was 100%, transmittance of each of the liquid crystal display panel of this example and the comparative panels was calculated.

As a result, the transmittance of the liquid crystal display panel was 65%, and the transmittance of the comparative panel A was 55%. Therefore, the transmittance of the liquid crystal display panel of this example was improved than that of the comparative panel by 10%. Further, in this example, only the blue pixel of the liquid crystal display panel was driven, but no color leakage was observed in the red and green pixels, and no influence of the liquid crystal orientation between the adjacent pixels was observed. On the other hand, when only the blue pixel was driven in the comparative panel C, color leakage was observed in the red and green pixels. Therefore, in the comparative panel C, it was confirmed that influence of the liquid crystal orientation was generated between the adjacent pixels.

Next, the liquid crystal display panel was disassembled, and then the liquid crystal composition A in the liquid crystal display panel was washed with benzene. After that, the liquid crystal display panel having benzene filled therein was cooled to 0° C. so as to remove the benzene by a freeze-drying technique. Then, the cross section of the liquid crystal display panel from which the benzene had been removed was observed using an electron microscope.

As a result, as illustrated in FIG. 6, the polymer structure 7 was observed at a position overlapping with the black matrix 13, which is between the video signal line 11 and the pixel electrode 8 and below the black matrix 13 of the color filter substrate 2. Further, on the surface of the panel, the polymer structure 7 having the shape illustrated in FIG. 9 was observed. Therefore, it was conceived that, because the polymer structure 7 was present, the influence of the liquid crystal orientation between the adjacent pixels was eliminated when the liquid crystal display panel was driven.

Further, as illustrated in FIG. 6, the respective pixels are separated by three layers having different compositions, that is, the polymer structure 7, the liquid crystal layer 3, and the polymer structure 7. In this manner, for example, light from the adjacent pixel is reflected by an interface between the layers. With this, in the respective pixels, the influence of light from the adjacent pixel is suppressed, and hence color leakage between the adjacent pixels is reduced.

Note that, in this example, effects of the FFS mode liquid crystal display panel, which is one type of the IPS mode liquid crystal display panel, were made clear, but it is apparent that, as for the operation mode of the liquid crystal layer in the liquid crystal display device, similar effects may be obtained even when a TN mode, an STN mode, a VA mode, an OCB mode, or an IPS mode is employed.

Further, in this example, the color filter substrate provided with the black matrix was used, but it is apparent that similar effects may be obtained even when a color filter substrate without a black matrix is used.

Further, the pixel electrode 8 and the common electrode 9 may be reversely arranged in the configuration of the liquid crystal display device. In this case, the polymer structure 7 is provided between the common electrode 9 and the signal line.

Example 2

In Example 2, a liquid crystal display panel was manufactured by a method similar to that in Example 1 except that the photomask used in the ultraviolet irradiation step was changed. In this example, there was used a photomask shaped so that light was transmitted only at the portion of the black matrix 13 illustrated in FIG. 5. That is, there was used a photomask which enabled formation of the polymer structure 7 between the video signal line 11 and the pixel electrode 8. In Example 2, a method similar to that in Example 1 was employed except for the photomask, and hence description related to the manufacturing procedure of the liquid crystal display panel is omitted.

The transmittance was evaluated in the liquid crystal display panel and the comparative panel manufactured as described above. As a result, the transmittance of the liquid crystal display panel was improved than that of the comparative panel by 10% or more. Further, only the blue pixel of the liquid crystal display panel was driven, but no color leakage was observed in the red and green pixels, and no influence of the liquid crystal orientation between the adjacent pixels was observed.

Next, the liquid crystal display panel was disassembled, and then the liquid crystal composition A in the liquid crystal display panel was washed with benzene. After that, the liquid crystal display panel having benzene filled therein was cooled to 0° C. so as to remove the benzene by a freeze-drying technique. Then, the cross section of the liquid crystal display panel from which the benzene had been removed was observed using an electron microscope.

As a result, as illustrated in FIG. 6, the polymer structure 7 was observed at a position overlapping with the black matrix 13, which is between the video signal line 11 and the pixel electrode 8 and below the black matrix 13 of the color filter substrate 2. Further, on the surface of the panel, the polymer structure 7 having the shape illustrated in FIG. 8 was observed. Therefore, it was conceived that, because the polymer structure 7 was present, the influence of the liquid crystal orientation between the adjacent pixels was eliminated when the liquid crystal display panel was driven.

Example 3

In Example 3, a liquid crystal display panel was manufactured by a method similar to that in Example 1 except that the configuration of the liquid crystal composition A and the ultraviolet irradiation condition in Example 1 were changed.

In this example, the weight percentages of the polymerizable monomer, the initiator, and the liquid crystal material in the liquid crystal composition A were 1.2 wt %, 0.1 wt %, and 98.7 wt %, respectively.

In this example, after carrying out the polymer structure forming step of applying ultraviolet light from the TFT substrate 1 side while using the photomask shaped so that light is transmitted only at the portion of the black matrix 13 illustrated in FIG. 4, to thereby polymerize the polymerizable monomer in the liquid crystal composition, a polymer stabilization step of applying ultraviolet light on the entire surface from the TFT substrate 1 side without using a photomask was carried out, to thereby form a polymer having a lower density than that of the polymer structure in the pixel. A similar photomask as in Example 1 was used, and the irradiation amount of ultraviolet light used when this photomask was used was 15 J in total at 365 nm. The polymerizing operation was carried out several times. After that, the irradiation amount of ultraviolet light used when the ultraviolet light was applied on the entire surface without a photomask was 3 J at 365 nm, and the operation of the entire surface irradiation was carried out only once. In this manner, the liquid crystal display panel including the liquid crystal layer 3 and the polymer structure 7, which were formed by using the liquid crystal composition A, was manufactured.

In Example 3, a method similar to that in Example 1 was employed except for the configuration of the liquid crystal composition A and the ultraviolet irradiation condition, and hence description related to the manufacturing procedure of the liquid crystal display panel is omitted.

The transmittance was evaluated in the liquid crystal display panel and the comparative panel manufactured as described above. As a result, the transmittance of the liquid crystal display panel was improved than that of the comparative panels by 10% or more. Further, only the blue pixel of the liquid crystal display panel was driven, but no color leakage was observed in the red and green pixels, and no influence of the liquid crystal orientation between the adjacent pixels was observed. Further, the response time was shortened by 10% or more in comparison to that of the comparative panel C.

Next, the liquid crystal display panel was disassembled, and then the liquid crystal composition A in the liquid crystal display panel was washed with benzene. After that, the liquid crystal display panel having benzene filled therein was cooled to 0° C. so as to remove the benzene by a freeze-drying technique. Then, the cross section of the liquid crystal display panel from which the benzene had been removed was observed using an electron microscope.

As a result, as illustrated in FIG. 6, the color polymer structure 7 was observed at a position overlapping with the black matrix 13, which is between the video signal line 11 and the pixel electrode 8 and below the black matrix 13 of the color filter substrate 2. Further, in plan view, there was observed the rectangular polymer structure 7 formed in a state overlapping with the four sides representing the border of the region surrounded by the signal lines as illustrated in FIG. 9. Therefore, it was conceived that, because the polymer structure 7 was present, the influence of the liquid crystal orientation between the adjacent pixels was eliminated when the liquid crystal display panel was driven. Further, a polymer having low density was also observed in the pixel. However, the polymer did not have a dense structure as that of the polymer structure 7 observed between the video signal line 11 and the pixel electrode 8, and the polymer was observed in a quite dispersed state. Depending on the density at that time, the polymer was observed in a thick film state on the substrate surface. Therefore, it was conceived that, because the polymer having low density was present in the pixel portion, the response time was shortened when the liquid crystal display panel was driven.

As described above, the present invention is specially described with reference to the embodiment of the invention, but the present invention is not limited to the embodiment described above. Various modifications may be made thereto within the scope of the sprit of the present invention.

Further, even when the liquid crystal layer 3 is formed by filling the liquid crystal composition using a one-drop filling (ODF) method rather than a vacuum filling method, it is similarly possible to provide a liquid crystal display panel (liquid crystal display device) having excellent transmittance and reliability. While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display device, comprising:
a first substrate;
a second substrate;
a liquid crystal layer filled between the first substrate and the second substrate;
a polymer structure formed in the liquid crystal layer; and
a plurality of pixels each including a first electrode and a second electrode, one of the first electrode and the second electrode being a pixel electrode, wherein:
each of the plurality of pixels is provided within a region surrounded by a signal line, a part of the signal line being formed between adjacent two of the plurality of pixels;
the polymer structure comprises two polymer structures;
the two polymer structures has the liquid crystal layer provided therebetween;
in plan view, the two polymer structures sandwich the part of the signal line;
in plan view, each of the two polymer structures extends along the part of the signal line;
the each of the two polymer structures is formed from one of the first substrate and the second substrate toward another of the first substrate and the second substrate; and
the each of the two polymer structures is formed so as to overlap with any of the region.

2. The liquid crystal display device according to claim 1, wherein the first electrode and the second electrode are formed on one of the first substrate and the second substrate.

3. The liquid crystal display device according to claim 1, wherein a color filter is formed on one of the first substrate and the second substrate.

4. The liquid crystal display device according to claim 1, wherein a black matrix is formed on one of the first substrate and the second substrate.

5. The liquid crystal display device according to claim 4, wherein the polymer structure is formed in a region overlapping with the black matrix in plan view.

6. The liquid crystal display device according to claim 5, wherein the polymer structure is formed in a region other than a region in which one or both of a scanning signal line and a video signal line are overlapped with the black matrix in plan view.

7. The liquid crystal display device according to claim 6, wherein a condition of the following Expression (1) is satisfied, $$WP \leq (WB-WS) \text{ or } WP \leq (WB-WG) \qquad \text{Expression (1)}$$

where, in a cross section taken along a short side of the polymer structure, WP represents a width of the polymer structure, WB represents a width of the black matrix, WS represents a width of the video signal line, and WG represents a width of the scanning signal line.

8. The liquid crystal display device according to claim 1, wherein the polymer structure is also formed in a region including an end portion of the pixel electrode in plan view.

9. The liquid crystal display device according to claim 1, wherein the liquid crystal layer contains a polymer having a density lower than a density of the polymer structure.

10. The liquid crystal display device according to claim 1, wherein:
the region has a rectangular shape in plan view; and
the polymer structure is formed so as to overlap with four sides of the region representing a border thereof.

11. The liquid crystal display device according to claim 1, wherein:
the region has a rectangular shape in plan view; and
the polymer structure is formed so as to overlap with two opposing sides out of four sides of the region representing a border thereof.

12. The liquid crystal display device according to claim 1, wherein the polymer structure is formed by polymerizing a polymerizable monomer in the liquid crystal layer.

13. The liquid crystal display device according to claim 12, wherein the polymer structure is formed by polymerizing the polymerizable monomer in presence of a photo-initiator in the liquid crystal layer.

14. A manufacturing method for a liquid crystal display device, the liquid crystal display device comprising: a liquid crystal layer filled between a first substrate and a second substrate; a plurality of pixels each including a first electrode and a second electrode, one of the first electrode and the second electrode being a pixel electrode; and a signal line formed between adjacent two of the plurality of pixels, in which the first electrode and the second electrode are formed on one of opposing surfaces of the first substrate and the second substrate, the manufacturing method comprising:
filling a liquid crystal composition containing host liquid crystal and a polymerizable monomer, the liquid crystal composition being used as the liquid crystal layer, between the first substrate and the second substrate; and
forming a polymer structure by polymerizing the polymerizable monomer, the polymer structure being formed in the liquid crystal layer between the signal line and the pixel electrode.

15. The manufacturing method for a liquid crystal display device according to claim 14, wherein the forming a polymer structure comprises applying light from one surface side of one of the first substrate and the second substrate on which the signal line is formed, the one surface side not being contact with the liquid crystal layer, to thereby polymerize the polymerizable monomer.

16. The manufacturing method for a liquid crystal display device according to claim 14, wherein the liquid crystal composition contains an initiator.

17. The manufacturing method for a liquid crystal display device according to claim 16, wherein the initiator comprises a photo-initiator.

* * * * *